E. P. RUSSELL.

Mode of Lighting Street Gas Burners.

No. 3,195. Reissued Nov. 17, 1868.

Witnesses:

Ch. H. Windez.

W. C. Clayton.

Inventor:

E. P. Russell by J. C. Clayton atty.

N. PETERS. Photo-Lithographer, Washington, D. C.

United States Patent Office.

E. P. RUSSELL (FOR HIMSELF) AND PORTER TREMAIN, (ASSIGNEE OF E. P. RUSSELL,) OF MANLIUS, NEW YORK.

*Letters Patent No.* 70,272, *dated October* 29, 1867; *reissue No.* 3,195, *dated November* 17, 1868.

MODE OF LIGHTING STREET-GAS BURNERS.

The Schedule referred to in these Letters Patent and making part of the same.

*To all whom it may concern:*

Be it known that I, E. P. RUSSELL, of Manlius, in the county of Onondaga, and in the State of New York, have invented a certain new and useful Mode of Lighting Gas-Burners for Streets and other places; and I do hereby declare that the following is a full, clear, and exact description thereof, reference being had to the accompanying drawings, forming a part of this specification.

Figure 1:
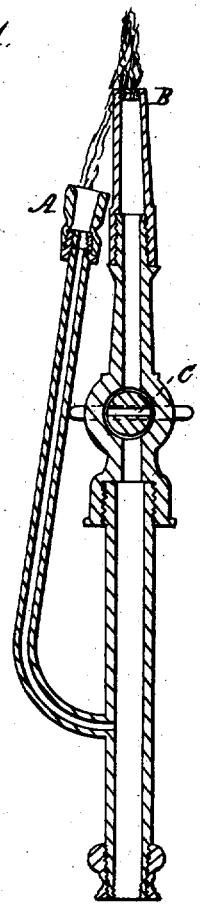
Figure 1 is a vertical section through the main gas-burner and the supplemental or "lighting-burner."
Figure 2:
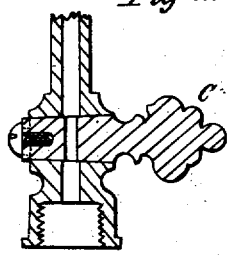
Figure 2 is a section through the gas-cock.

My invention consists in providing the main gas-burner with a small supplemental gas-burner, on a small pipe branching from the main pipe a short distance below the main burner, so that a small and constant jet of flame from the small burner will serve to light the large burner when its cock is turned.

This device is to be used principally in connection with an automatic device for lighting street-lamps. There are various devices and modifications of my invention, but I prefer that shown in the drawing.

The gas flows continually up through the "lighting-burner" A, which is made cup-form, with a very small orifice, and is there lighted and kept constantly burning in a small jet.

The cock C, of the main burner B, is operated by suitable machinery, or by hand, so as to be turned off or on at any desired time. As soon as the cock is turned on, the gas escapes at the main burner, and is instantly lighted by the small jet issuing from the "lighting-burner."

The value of the very small quantity of gas needed to maintain a sufficiently constant lighting-jet is almost inappreciable, scarcely more (if as much) than that of the matches ordinarily used.

The supplemental pipe may, however, be attached either above or at the cock C, so as to be controlled by it, or it may have a separate cock of its own.

I do not claim an intermitting gas-jet for lighting the main burner, as claimed by Locke and Ulrick, patented the 16th day of April, 1867; but

What I claim as my invention, and desire to secure by Letters Patent, is—

A small supplemental burner, A, to be kept burning constantly, and the pipe leading thereto, when operating in connection with a main burner, substantially as and for the purposes set forth.

E. P. RUSSELL.

Witnesses:
N. B. SMITH,
P. CORBETT.